Figure 1:
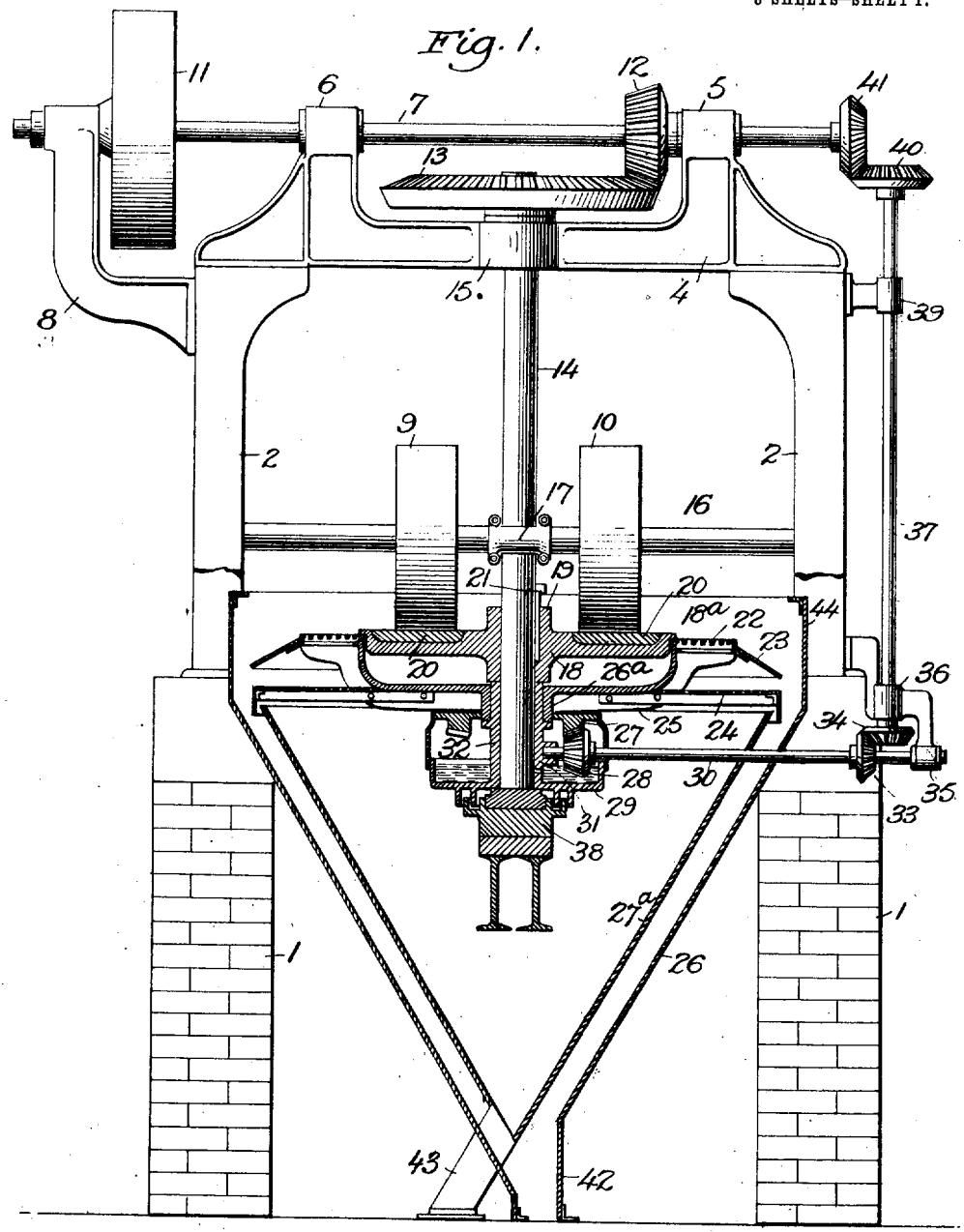

R. C. PENFIELD.
DRY PAN.
APPLICATION FILED JULY 13, 1909.

974,817.

Patented Nov. 8, 1910.
3 SHEETS—SHEET 1.

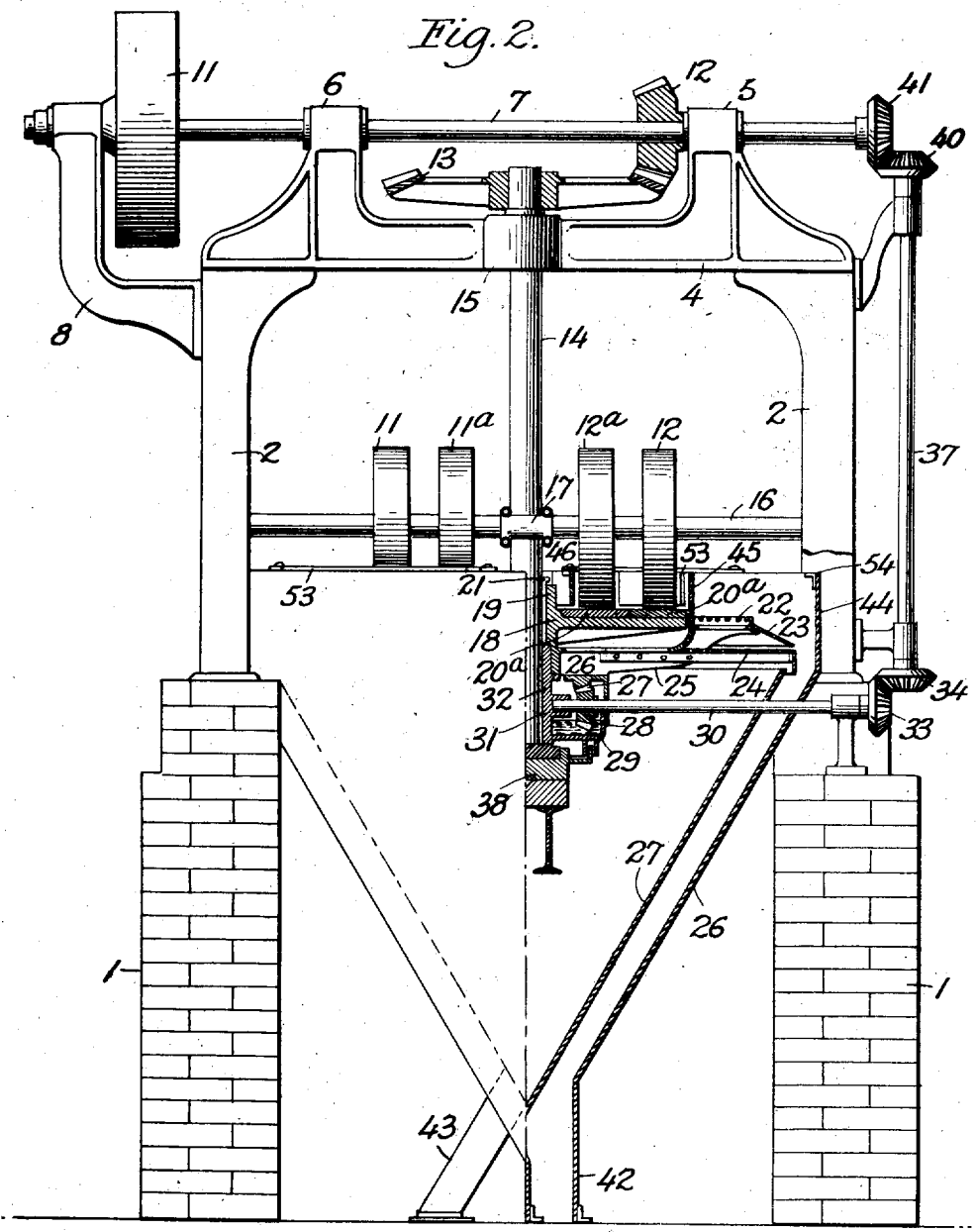

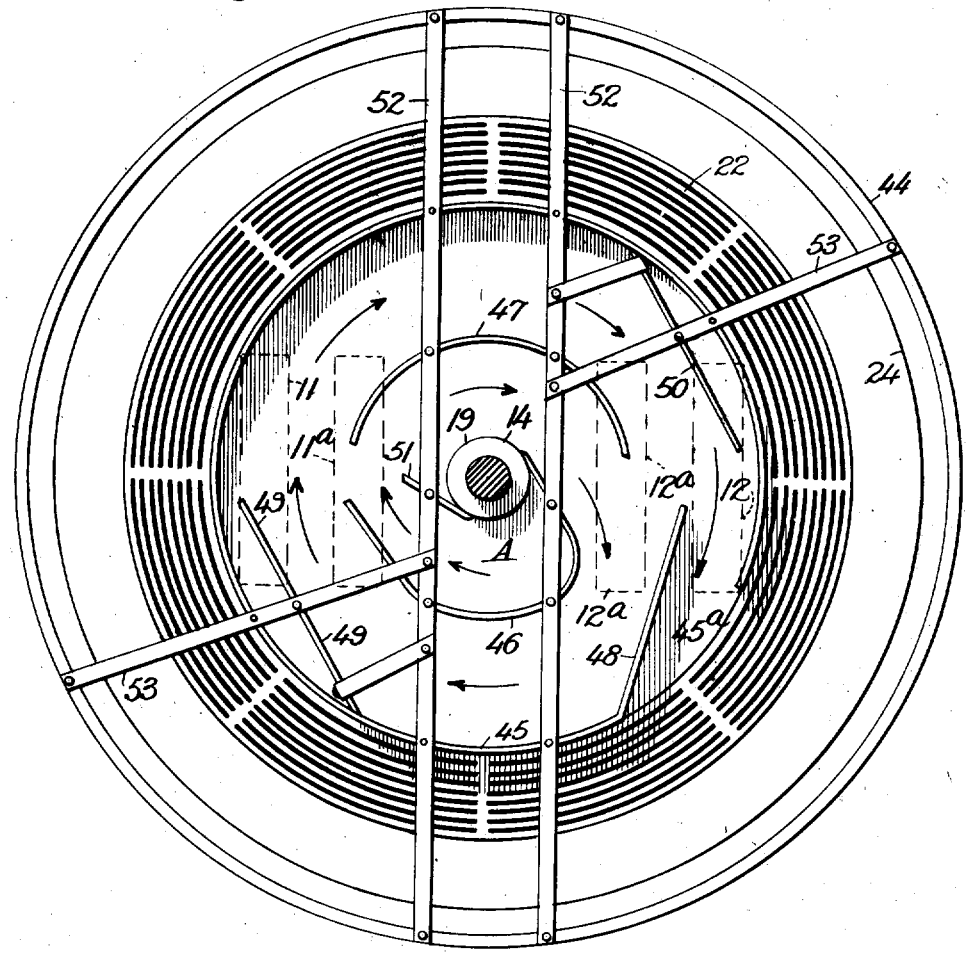

UNITED STATES PATENT OFFICE.

RAYMOND C. PENFIELD, OF NEW YORK, N. Y.

DRY-PAN.

974,817. Specification of Letters Patent. Patented Nov. 8, 1910.

Application filed July 13, 1909. Serial No. 507,421.

*To all whom it may concern:*

Be it known that I, RAYMOND C. PENFIELD, a citizen of the United States of America, residing at New York city, in the county of New York and State of New York, have invented certain new and useful Improvements in Dry-Pans, of which the following is a specification, reference being had therein to the accompanying drawing.

My invention relates to a dry pan for use in the manufacture of clay products for crushing or grinding and screening clay and similar substances, the object of the invention being to simplify, perfect and make more efficient a pan of this class.

One of the chief difficulties with dry pans as heretofore constructed is to obtain a large capacity for the space occupied. One reason for not being able to obtain a large capacity is that the speed of the pan which is often very great causes the material, after it is ground under the mullers, to pass by centrifugal force over the screen too rapidly to permit of a proper and efficient screening. It becomes a matter of extreme importance, therefore, to regulate the speed of the screen in such a way that it may do efficient work, and in my present improvements the screen is speeded differently from and independently of the grinding devices. The invention, therefore, comprises means for overcoming the difficulty mentioned.

The invention consists essentially of a grinding element revolving and operating at a certain speed and a screening element running at a different speed which will ordinarily be a slower speed.

The screening device includes a primary screen and a secondary screen, the latter being of finer mesh and situated below the former, both screens being supported on the same revolving frame which is actuated independently of the grinding mechanism.

The invention also includes a hopper construction with a number of receptacles or bins for receiving the clay or other material of varying degrees of coarseness and of disposing of the same in the manner required.

Furthermore, the invention includes means whereby a plurality of mullers may be employed and a novel and ingenious scraper mechanism having curved or serpentine blades, and arranged so that the clay which is received near the center of the pan may be delivered under the mullers and directed by the scrapers along a certain irregular course until it is finally discharged upon the primary screen and passed thence to the secondary screen and then into the hoppers. And the invention also includes various details and peculiarities in the construction, combination and arrangement of the various parts substantially as will be hereinafter described and claimed.

In the accompanying drawings, illustrating my invention, Figure 1 is a vertical sectional front elevation of my improved dry pan or grinding mill. Fig. 2 is a similar sectional front elevation of the same, showing an increased number of mullers and a modified form of grinding base and grinding plates. Fig. 3 is a plan view, illustrating my improved arrangement of scrapers in connection with the pan and screen.

Similar characters of reference designate corresponding parts throughout the different figures of the drawings.

1 denotes a pier or foundation of brick, concrete, or other suitable material, on which the mechanical parts of the pan and the devices for actuating the same are mounted conveniently for operation. The main framework of the pan consists of side frames 2 securely fixed upon the foundation 1. Upon the frames 2 is supported a horizontal cross frame 4 which is rigidly affixed to the frames 2. This frame 4 provides journal bearings 5 and 6, preferably made as roller bearings, in which is rotatably mounted a horizontal shaft 7 whereon is a driving pulley 11 which may obviously be a plain pulley or a tight and loose pulley, either of which will perform the same function as the friction pulley indicated in the drawing. A bracket 8 secured to one of the side frames 2 serves to provide another bearing for the shaft 7, which bearing is at one end of said shaft. The drive pulley 11 is located on the shaft 7 between the bracket 8 and the bearing 6. Also, on the shaft 7, preferably close to the bearing 5, is a bevel driving pinion 12 which meshes with a horizontal master gear wheel 13 that is securely fastened upon the upper end of a vertical main driving shaft 14 which occupies a position centrally in the machine. Shaft 14 is supported at its upper end in a bearing 15 constructed near the central point of the horizontal cross frame 4.

In Fig. 1, I represent two mullers 9 and 10. These mullers or grinding wheels occupy a vertical position on opposite sides of the shaft 14 and are rotated by the revolution of the grinding base or pan beneath them. The material to be crushed is delivered or fed into the pan so that it will be brought under the action of the mullers in their rotation and thereby crushed. These mullers 9 and 10 are supported in any suitable manner upon shafts 16 having bearings in the center boxing 17 and in the side frames 2 as shown. Since the shaft or journal arrangements for sustaining the mullers 9 and 10, and permitting them to easily revolve, may vary within wide limits, I make no special claim at this time in this application to any of the detailed features of construction of said muller shafts.

In Fig. 2, I show two mullers on each side of the shaft 14, those on one side being designated 11 and 11ª, and those on the other side, 12 and 12ª. These mullers, like the mullers 9 and 10, are supported in any suitable manner upon shafts 16, which have bearings at the center and ends. In some cases two mullers or one at each side of the shaft 14 will be found sufficient, while in others it will be more convenient to employ two pairs, one pair at each side of the shaft 14; but I do not wish to be confined to any particular number, size, shape, or arrangement for these mullers since obviously they may vary in these respects within wide limits.

The grinding pan proper comprises in Fig. 1 one set of grinding plates 20, of which there may be any number arranged in a circular series beneath the mullers 9 and 10, and in Fig. 2 of two sets of grinding plates 20ª located alongside of each other in two circular series, there being any number of these plates. The grinding plates 20 or 20ª, as the case may be, are supported upon a grinding base 18 having a central hub 19 which is keyed to the shaft 14 by means of a suitable key or wedge 21 (see Figs. 1 and 2). Of course, as is indicated in Fig. 2, the grinding base 18 which is designed to support two sets of grinding plates 20ª is necessarily made wider and stronger than the base 18 as in Fig. 1, which is only designed to support a single series of grinding plates 20. Although, of course, I do not desire to be confined to any particular dimensions of these parts, since obviously when there are two sets of grinding plates, the individual plates may be made smaller than in the case where there is only one series; and when there are four mullers, each muller may be smaller than the individual muller of a machine employing only two mullers.

22 designates a screen which may be a single circular perforated plate, or may be a number of plates arranged in a circular series and having suitable openings therein. Screen 22 is the primary screening device, and is concentric with the grinding base surrounding the latter, preferably in substantially the same horizontal plane, and it is found convenient in some cases to provide the grinding base 18 with a rabbeted or flanged edge 18ª which may slightly overlap the edge of the screen 22. Surrounding the screen 22 and secured in some suitable manner to the outer edge thereof is an inclined apron of sheet metal or other substance down which the material which does not pass through the screen plates 22 may pass from the edge of the latter plates, and by said apron be directed into the upper end of the tailings hopper 26. Below the screen 22 is a secondary screen 24 usually of a finer mesh, and below it is a screened clay hopper 27ª arranged inside of the tailings hopper 26, the two hoppers being more or less concentric. The secondary screen 24 is secured to and carried by the same frame which supports the primary screen 22, so that these two screens revolve in unison and do not have independent rates of revolution. The screen supporting frame which carries the two screens 22 and 24 may be constructed in a variety of ways, but ordinarily will consist of a main section 26ª having a central hub which surrounds a stationary hub 32 which is loose on the main shaft 14. This main section 26ª and its hub of the screen supporting frame are made integral with a plurality of rotating arms 25 which extend upwardly so as to sustain the plates 22 in position and yet provide a skeleton framework which will offer no objection to the falling of the material through the screen 22 and on to the secondary screen 24. Supported in suitable journal bearings below the screens is a horizontal shaft 30 on which near its inner end is a pinion 28 which meshes with a gear wheel 27 forming a part of the frame 26ª of the secondary screen 24, which frame, as I have stated, has a hub that revolves loosely around the stationary hub 32. Hub 32 forms part of a gear casing 29 which contains a suitable amount of lubricating oil. The end of the shaft 30 is received into a bearing 31 that forms a part of the stationary hub 32. Thus the revolution of the shaft 30 actuates the pinion 28, thereby driving the gear wheel 27 and imparting a rotary movement to the screen supporting frame 26ª and the two screens 22 and 24. On the end of the shaft 30 opposite to where the pinion 28 is located is a miter pinion 33 which meshes with another miter pinion 34 on the lower end of the vertical shaft 37 which is suitably supported alongside of the frame 2 in suitable bearings provided by the brackets 36 and 39 for example.

The outer end of the shaft 30 in the specimen of mechanism illustrated in Fig. 1 is carried in a bearing 35 which forms a part of the same bracket that provides the bearing 36 for the vertical shaft 37, but, of course, these details may vary. At the upper end of the shaft 37 is a miter pinion 40 which meshes with a corresponding miter pinion 41 on the extremity of the upper shaft 7. In this way, it will be seen that motion is communicated from the driving shaft 7 at the top of the machine to the vertical shaft 37, and from it through the gears 34 and 33 to the screen actuating shaft 30, and while power is being imparted through the gears 12 and 13 to the central driving shaft 14 for the purpose of driving the grinding mechanism at a certain speed, power is being simultaneously imparted to the various shafts and gears, as I have explained, for the purpose of driving the screens 22 and 24 independently of the grinding mechanism; but in the present form of my invention the two screens move in unison with the same rate of revolution, which is usually slower than the rate of revolution of the grinding mechanism.

The oil box and gear casing 29 has a support upon a step casting or bearing of some suitable kind 38, which likewise sustains the lower end of the main driving shaft 14. The details of construction of the hopper devices 26 and 27 may vary greatly. In general it may be said that they are of a conical shape. The tailings hopper 26, which is the outermost of the two hoppers, has a discharge spout 42 from which the coarse material can be removed and taken back into the pan by any suitable mechanism for the purpose of being reground. The inner hopper 27, which is directly beneath the finer screen 24, has a discharge spout 43 at the lower end thereof from which the completely reduced and fine material is carried away to be used wherever needed. These hoppers are supported in any desired manner and are made of suitable size to perform their duty. The tailings hopper 26 is preferably provided with a steel cylindrical husk 44 at the upper end thereof which surrounds the screening and grinding mechanism and forms, as it were, the outer wall of the pan, said husk being for the purpose of preventing the contents of the pan from being thrown outside of the same, and therefore serves the purpose of compelling the material which passes from the primary screening device 22 to pass into the tailings hopper when it falls down the incline of the apron 23. It is found in practice that better results are obtained in allowing the material to fall from the screen devices into a tailings hopper and returned thence to the pan to be reground than to employ scrapers to scrape the material from the upper or primary screen back upon the muller plates, for in dispensing with the scrapers friction on the screen is avoided and power is saved for not so much is required to drive the pan. Also, frequent repair bills for renewals are avoided largely. It is to be noted, moreover, that any of the material which passes the first screen 22 and falls upon the secondary screen 24 and fails to pass through the latter will by centrifugal force be thrown off the edge of the latter screen 24 and caused to enter the tailings hopper 26, for the husk 44 is far enough away from the edge of the screen 24 and from the edge of the apron 23 to allow not only the passage of material into the hopper 26 from the apron 23, but also from the edge of the screen 24.

I have already explained that the general operation of that form of the invention illustrated in Fig. 2 is virtually the same as in Fig. 1, except that more mullers are used and more muller plates, but the primary and secondary screens are supported and driven in the same manner, being operated jointly and having a revolution independent of the revolution of the grinding mechanism. In Fig. 2, however, and also in Fig. 3, I have represented an improved arrangement of scraper devices for directing the material under the different mullers and then discharging it upon the primary screen. Surrounding the grinding base, the grinding plates, and the mullers, is a stationary vertical cylindrical rim 45 which is cut away at 45$^a$ to provide an opening alongside of the screen 22. This rim 45 has its upper edge preferably in about the same horizontal plane of the upper edge of the husk 44. It is supported in any suitable manner, as, for instance, by the cross pieces 52 and 53 which are riveted or bolted to the upper edge of the husk 44, or the angle bar 54 at that point; but obviously the rim 45 may be carried in any other manner and by different means, it being only necessary that it should clear the surface of the grinding plates 20$^a$ sufficiently to allow said plates to revolve freely beneath it. The material to be ground, such as shale, or any other kind of clay, is first deposited in the pan near the shaft 14 at the point A. 46 denotes a stationary serpentine scraper, one end of which is close to the shaft 14 or the pan hub 19, and it curves away therefrom and has a portion of its length concentric with the stationary rim 45. Also, at the center point of the pan is a scraper 51 which extends in the same direction as one end of the serpentine scraper 46 forming therewith a channel through which the material is first delivered under the impulse of the rotation of the pan. 47 designates another curved stationary rim or scraper which is opposite to the serpentine scraper 46 and is concentric with the large outer rim 45. Further, it will be observed that there are straight blades or scrapers 48, 49 and 50 located at different points in the length of the stationary rim 45 extending inwardly therefrom at an angle and distributed at a point substantially equidistant from each other around the length of the rim 45. All these scrapers 46, 47, 48, 49, 50 and 51 are supported in any suitable way as, for instance, by means of the cross pieces 52 and 53 so that the grinding base 18 and the plates 20$^a$ may revolve beneath them in the usual manner, and so that the mullers 11, 11$^a$ and 12, 12$^a$ may have a free action in the pan during the revolution of the latter. The material which is first delivered at A is directed, as shown by the arrows under the muller 11$^a$ from which the stationary rim 47 guides it to the other side of the machine where it passes under the muller 12$^a$, then following the course indicated by the arrows it is taken to the opposite side of the pan and passed under the muller 11 and then it follows the curvature of the channel between the stationary rim 45 and the other rim 47 until it reaches the scraper 50 and is brought under the action of the muller 12. After leaving said muller it passes out through the opening 45$^a$ and is screened by the primary screening device 22, the coarser particles that will not pass through the screen 22 falling over the apron 23 into the tailings hopper 26. The finer particles go through the primary screen 22 and drop upon the finer screen 24, and if there are any that are too coarse to pass said screen 24, they will fall from the periphery of the screen also into the tailings hopper 26, as I have hitherto quite fully pointed out. It will be understood that the object of this design, wherein a number of stationary scrapers are employed in conjunction with the grinding devices, is to dispense with scrapers on the screens as has heretofore been the usual practice for scraping the material off the screen plates and delivering it to the mullers, for it is desirable to prevent the screen plates from becoming so rapidly worn as they do when they are constantly being scraped, for thereby considerable expense in the operation of the pan is saved.

There may be many modifications in the construction and arrangement of the plural scraping devices which I have just described which provide a circuitous course for the material in the pan and enable it to be brought under the action of all the mullers, and I therefore reserve the liberty of making such changes as may be found essential. Furthermore, with respect to all the parts constructed and combined throughout the machine, it is obvious that many changes and re-arrangements may be provided, etc., without exceeding the scope of the appended claims, and I therefore reserve the liberty of making such needful changes in this respect as experience may suggest.

Having thus described my invention, what I claim as new and desire to secure by Letters Patent, is:

1. In a dry pan, the combination with grinding mechanism including a grinding base and mullers operating in association therewith, of a primary screen located in substantially the same plane as the grinding base, and a secondary screen, said primary and secondary screen being parallel to each other and connected together and having the same rotary movement, which movement is independent of the movement of the grinding mechanism.

2. In a dry pan, the combination with a grinding base, of means for imparting thereto a certain rate of revolution, a screen mechanism comprising primary and secondary screening elements arranged parallel to each other, said primary screening element being located in substantially the same plane as the grinding base, and means for imparting to the screening mechanism a rate of revolution independently of that of the grinding mechanism.

3. In a dry pan, the combination of a grinding pan, mullers therewith, means for imparting a certain rate of revolution to said pan, screening mechanism comprising a primary screen located in substantially the same plane as the grinding pan and a secondary screen parallel to and below the primary screen, said screening mechanism having a joint motion independently of the motion of the pan, and an apron encircling the periphery of the screening mechanism and receiving the coarse material which does not pass through the latter.

4. In a dry pan, the combination of a grinding base, mullers arranged to operate in association therewith, a screening mechanism including a primary screen having coarse openings and situated in substantially the same horizontal plane as the grinding base, and a secondary screen having finer openings and located below the primary screen and parallel thereto, means for imparting a rotary motion to the screening mechanism independently of the motion of the grinding devices, a tailings hopper receiving the material that does not pass through the screens, and a second hopper receiving the screened material.

5. In a dry pan, the combination of a grinding base, mullers therewith, a screen for screening the material after it leaves the base, said screen consisting of primary and secondary screening elements which are parallel to each other and one of which is in a plane below the other, an apron carried by the screen at its periphery, and a hopper for receiving the material delivered thereto by the apron.

6. In a dry pan, the combination with a grinding pan having an independent revolution, a screen outside of the grinding pan and revolved independently thereof, said screen consisting of a primary coarse screen and a secondary finer screen which are parallel to each other, the coarse screen being in substantially the same plane as the pan, an apron encircling the periphery of the first screen, a hopper into which the coarse material passes from said apron and also from the edge of the second screen, and a second hopper receiving the screened material.

7. In a dry pan, the combination of a grinding base and mullers, a plurality of screens which successively receive the material and screen it to the proper degree of fineness, an apron for directing the unscreened material from the first screen into a receptacle, concentrical receptacles the outer of which receives the coarse material while the inner receives the screened material, said receptacles located below the grinding and screening mechanism.

8. In a dry pan, the combination of a grinding pan and mullers therewith, two or more screens arranged to be driven together but independently of the revolution of the pan and mullers, said screens being parallel to each other and one of them being in substantially the same horizontal plane as the grinding pan, means consisting of an inclined apron encircling the periphery of the first screen for diverting the coarser material, concentric hoppers one of which receives the coarse material and the other the screened material, and discharging means arranged in connection with said hoppers.

9. In a dry pan, the combination with the grinding mechanism, of a stationary rim having a discharge opening, and a screen receiving the crushed material from said opening, the rotation of said screen being independent of the rotation of the grinding mechanism, together with means for rotating the screen and the grinding mechanism.

10. In a dry pan, the combination of the pan proper, mullers therefor, a stationary rim encircling the mullers above the pan and provided with a discharge opening, a screen receiving the crushed material which passes through said opening, an apron surrounding the screen for diverting the unscreened material, and a bin or hopper into which said unscreened material passes.

11. In a dry pan, the combination of the pan proper, mullers therefor, a stationary rim above the pan and having a discharge opening, and a plurality of stationary scrapers arranged within the pan and above its grinding surface and directing the material through a circuitous channel provided by said scrapers toward said discharge opening.

12. In a dry pan, the combination of a grinding base, mullers arranged therewith, a stationary encircling rim at the outside edge of the base having a discharge opening, a screen outside of said rim and receiving the material through the discharge opening, and a plurality of scraper devices arranged above the base and contiguous to the mullers whereby the material is directed through a circuitous channel and under the mullers and finally out through the discharge opening.

13. In a dry pan, the combination of a grinding base, mullers arranged in association therewith, a stationary rim having a discharge opening, and a plurality of stationary scrapers inside of said rim and above the grinding surface, said scrapers providing a circuitous channel for directing the material being operated upon from the center of the pan under the various mullers successively to the peripheral discharge.

14. In a dry pan, the combination of a grinding base and its plates, mullers above said plates, a stationary outside rim supported above the grinding surface and having a discharge, scrapers arranged within the grinding pan, and comprising central sections and outside blades all arranged to direct the material which is deposited centrally in the pan away from the center and under each one of the mullers successively until it finally reaches the stationary rim and is discharged through the opening therein.

15. In a dry pan, the combination of a grinding base and its plates, mullers operating in conjunction with said plates, a stationary outside rim having an opening, inner stationary scrapers concentric with the outside rim, a central serpentine scraper, and peripheral scrapers, all of said scrapers acting in conjunction with each other to provide a circuitous channel through which the material passes from the central portion of the pan toward the stationary rim through which it is finally discharged, and a screen receiving the crushed material when so discharged.

16. In a dry pan, the combination of a grinding base and its plates, mullers arranged in association therewith, a stationary outside rim having a discharge, stationary scrapers arranged above the grinding surface for providing a circuitous channel for the material so that it will pass beneath the various mullers and finally be discharged through the opening in the rim, a plurality of screening devices receiving the crushed material and screening it to the proper degree of fineness, a tailings hopper for receiving the unscreened or coarse material, and a screened clay hopper for receiving the screened material.

In testimony whereof I affix my signature in presence of two witnesses.

RAYMOND C. PENFIELD.

Witnesses:
 JEANNETTE STORK,
 C. B. SCHROEDER.